Aug. 11, 1931.  M. C. HURST  1,818,397
SHINGLE CUTTER
Filed Aug. 15, 1927
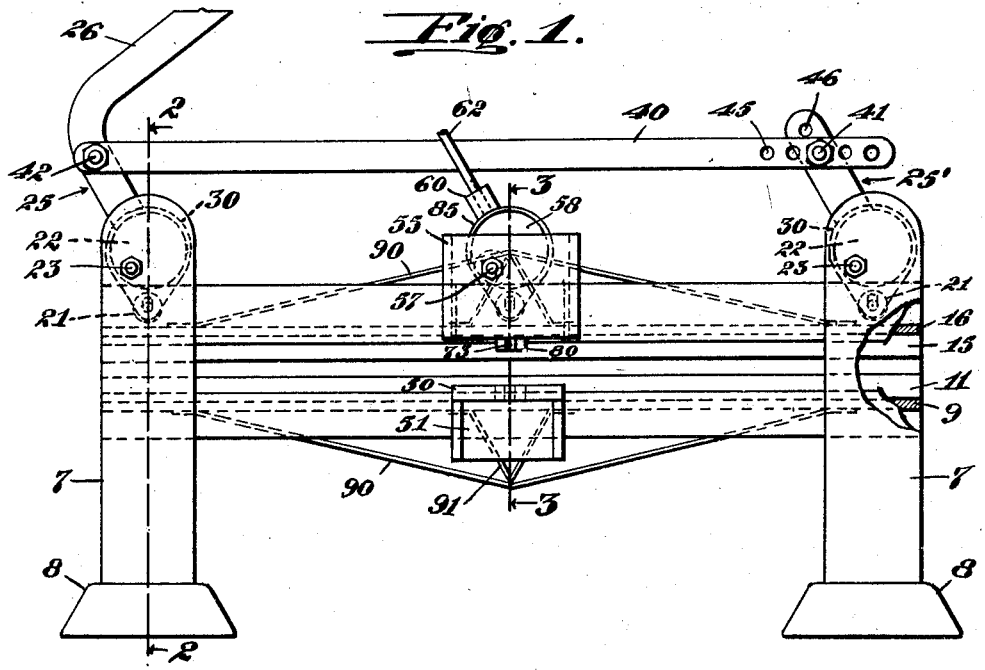
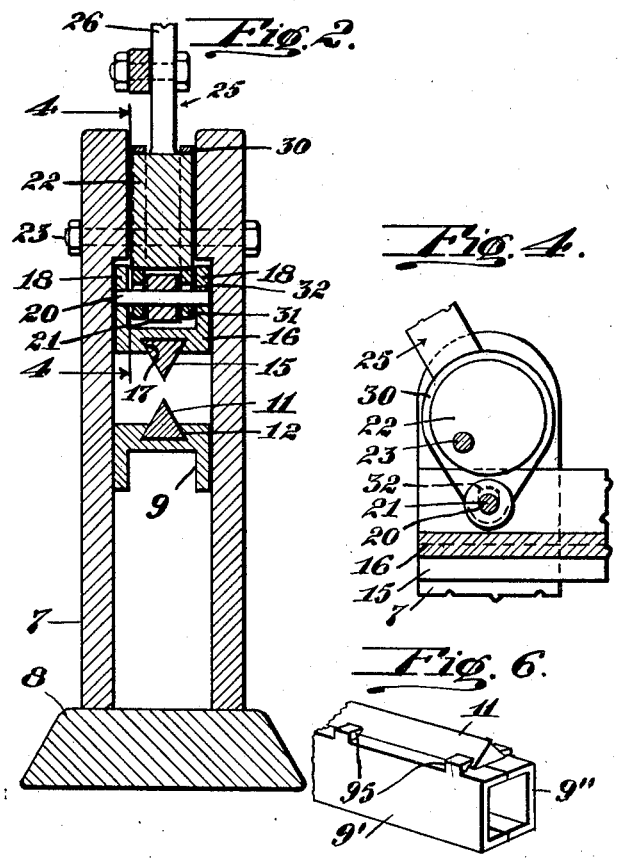
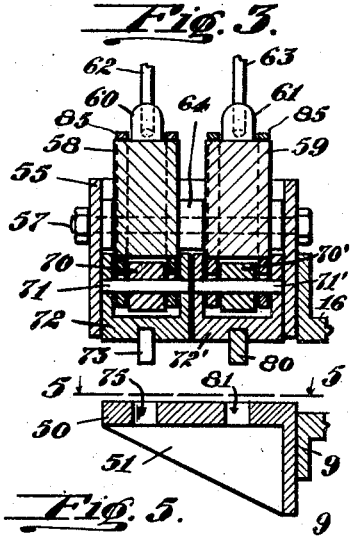
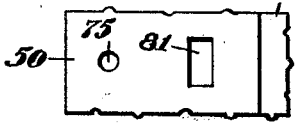
Inventor:
Martin C. Hurst,
By R. S. Burr,
Atty.

Patented Aug. 11, 1931

1,818,397

UNITED STATES PATENT OFFICE

MARTIN C. HURST, OF LOS ANGELES, CALIFORNIA

SHINGLE CUTTER

Application filed August 15, 1927. Serial No. 212,972.

This invention relates to cutting and punching mechanism and more particularly pertains to a machine for severing sheet material such as slate, composition shingles, and the like.

An object of the invention is to provide a machine of the above character embodying simple and efficient means for converting a rocking motion into a reciprocal motion adapted for use in effecting lever actuation of cutters and punches.

Another object is to provide a portable shingle cutter in which cutting blades may be lever-actuated to effect a shearing action, and in which the cutting blades may be readily removed and replaced.

Another object is to provide a blade and blade mounting in a shingle cutter whereby the blade may be formed with a plurality of cutting edges so that as one edge becomes worn the blade may be positioned to present another cutting edge.

Another object is to provide a shingle severing machine which is operable to cut a shingle either along a straight or curved line so as to facilitate the fitting of the shingle, and which is adapted to be readily operated by the shinglers on roofs or scaffolds contiguous to the point of application of the shingles.

A further object is to provide a machine of the above type which may be constructed to be light in weight; in which the moving parts are few and are adapted to be readily removed and replaced.

With the foregoing objects in view together with such other objects and advantages as may subsequently appear, the invention resides in the parts and features hereinafter described and claimed and illustrated by way of example in the accompanying drawings in which:

Fig. 1 is a side elevation of the complete device, except that portions of the operating handles are broken away to contract the view;

Fig. 2 is a vertical section on line 2—2 of Fig. 1;

Fig. 3 is a sectional detail on line 3—3 of Fig. 1;

Fig. 4 is a sectional detail on line 4—4 of Fig. 2;

Fig. 5 is a transverse section on line 5—5 of Fig. 3;

Fig. 6 is a perspective view of a fragment of one of the knives and its carrier to illustrate a modification.

Referring in detail to the drawings the frame of the machine comprises two double standards 7 each having a base or foot portion 8; said standards being secured together in spaced relation to each other by means of an inverted channel iron bar 9 which fits within said standards and is secured in fixed relation thereto by welding or otherwise, at about their mid-height.

The stationary knife 11, is an elongated blade having, in cross section, a plurality of angles each of which forms a cutting edge. In the drawings this blade is triangular in cross-section, being removably seated in a dove-tail groove 12 formed in the base of the inverted channel iron 9, which carries said knife 11.

A movable cutting blade 15 is mounted above and in approximate parallel relation to the stationary cutting blade 12. Said movable blade is carried by the movable channel iron bar 16, being removably seated in a dove-tail groove 17, in the base portion of said bar 16, the latter having side flanges 18. Near each end of the bar 16 a transverse pin or shaft 20 connects said flanges 18 and forms a bearing for an anti-friction roller 21, the latter being acted upon by a circular, eccentric cam 22 supported by a pin or bolt 23, which forms a bearing therefor.

In fixed relation to, or formed as a part of said cam 22, is an operating lever 25, the handle 26 of which is desirably formed at an angle to its shank, as shown. In order that the angle iron bar 16 may be raised as well as depressed by the operation of said lever 25, a pair of metallic stirrups or hanger rings 30 are provided, which at their lower sides are furnished with extensions 31 having vertically elongated holes 32 to receive shaft 20. Said stirrups embrace the cam 22 one at each side of the lever 25, it being understood that said lever where it joins the cam is of less width than the latter. The slight vertical elongation of the holes 32 of each stirrup allows the cam 22 to depress the stirrup without moving the anti-friction roller 21 till the cam engages the latter.

At the other end of the machine the parts just described are, in the main, duplicated, and are therefore similarly lettered in the drawings, except that 25' designates the operating lever which preferably consists of a short, straight arm and which is operated by a link or connecting bar 40 to which it is adjustably pivoted by a pin or bolt 41, the other end of said link being, by a pivot bolt 42, pivoted to operating lever 25, so that when the latter lever is operated, movement will also be communicated to the short lever 25'. A plurality of longitudinally spaced pivot holes 45 are provided in link 40 to cooperate with like pivot holes 46 in the lever arm 25'. These cooperating pivot holes provide for adjustably connecting link 40 with arm 25' so that the adjacent end of knife 15 may be raised or lowered with relation to its other end, and thus with relation to the stationary blade 11, said blade 15 may be supported in a more or less inclined or shearing position during its cutting movements.

The appliance is adapted for use in cutting a variety of materials but is more particularly designed, in the illustrated embodiment of the invention, for roofers' use in cutting down the width and length of composition shingles and for punching nail holes and other apertures through such shingles. The elements which may be used to perform this punching function are illustrated in Figs. 3, 4 and 5. Referring to these views, the female element of the punch consists of a horizontal plate 50 formed as a part of a bracket 51 attached in any desired manner to the side of the stationary channel bar 9 at about the mid-length thereof. The male portion of this device consists of an open-ended rectangular upright casing 55 which is secured to the side of the upper channel bar 16 and moves up and down therewith.

Across said casing 55 extends a transverse pivot bolt 57 upon which are mounted two eccentric cams 58 and 59 having shanks 60 and 61 to receive operating handles 62 and 63. Said cams are spaced apart by a spacing nut 64 located on and at the mid-length of pivot bolt 57, so that cam 58 is positioned to act upon an anti-friction roller 70 mounted on a pivot 71 carried by a short channel iron head 72 which is provided with a circular punch 73 that cooperates with the circular hole 75 in the stationary die element to punch nail holes. The other punching element has a corresponding head 72', pivot 71' and roller 70', but its punch 80 is adapted to cooperate with the rectangular, somewhat elongated hole 81 in the stationary element, so that by punching a succession of holes a shingle may be recessed along, for example, a curved line to fit it to a vent pipe or other object. Said punches 73 and 80 are, of course, not the only forms of cutting tools that might be used in the relation set forth.

Each of the punching elements is provided with two stirrups 85 attached to the head 72 (or 72') and embracing the cams to lift said heads, the general arrangement of these stirrups being the same as that of the stirrups 30 first described. The punching device is so arranged that when the cutting blade 15 is in the uppermost position, the punches and punch-holes are in about the spaced relation to each other shown in Fig. 3.

The punching operations may then be performed without difficulty. It will be seen that the cam, stirrup and anti-friction roller construction shown in Fig. 3, is applied to all the various cutting tools that have been described, the punches 73 and 80 also being regarded as cutting tools. Trusses are shown to reinforce the channel-iron bars 9 and 16, said trusses desirably consisting of the rods 90 and central angular braces 91.

In Fig. 6 is shown, as a modification, a channel iron 9, on which are formed spaced opposed pairs of lugs 95 which inter-lock with the base portion of the triangular cutting blade to removably retain said blade in place; the opposed lugs forming dove-tail channels in which the blade is inserted longitudinally.

I claim:

1. A cutting device, comprising a cutting tool, a carrier therefor, an anti-friction roller pivotally mounted on said carrier, a cam to act upon said roller to impart a cutting movement to said tool, and a stirrup mounted on said carrier and embracing said cam to cause the receding movement of said cam to retract said tool, the stirrup being provided with an elongated opening for receiving the pivot of the anti-friction roller so that the stirrup is prevented from moving the roller before the cam engages the latter.

2. In a cutting device, a channel iron bar having a seat in its base adapted to receive a cutting tool, a pin extending across the channel of said bar, an anti-friction roller on said pin, an operating cam to engage said roller so as to cause a cutting movement of the tool, means to operate said cam, and means connected with the cam so as to cause the receding movement of the cam to retract the tool, the pin being received in the last-mentioned means in such a manner that the latter is prevented from moving the anti-friction roller before the cam engages the roller.

3. A cutting device comprising a frame, a cutting tool, a carrier for said tool slidably supported on said frame, an anti-friction roller pivotally mounted on said carrier, a cam turnably mounted on said frame engageable with said roller to effect movement of said carrier in a downward direction, and a stirrup loosely connected to said carrier and embracing said cam through which said cam will act to move said carrier in an upward direction.

4. A cutting device comprising a frame, a cutting tool, a carrier for said tool slidably supported on said frame, a cam turnably mounted on said frame, a stirrup embracing said cam, a loose connection between said stirrup and said carrier to permit relative movement between said stirrup and said carrier, and a bearing on said carrier operatively engageable by said cam to effect movement of said carrier independent of said stirrup.

In testimony whereof, I have affixed my signature.

MARTIN C. HURST.